(12) United States Patent
Matsuoka

(10) Patent No.: US 9,272,410 B2
(45) Date of Patent: Mar. 1, 2016

(54) SHEET FEEDING DEVICE AND IMAGE FORMING APPARATUS

(71) Applicant: KYOCERA DOCUMENT SOLUTIONS INC., Osaka-shi (JP)

(72) Inventor: Keiji Matsuoka, Osaka (JP)

(73) Assignee: KYOCERA DOCUMENT SOLUTIONS INC., Osaka-shi (JP)

( * ) Notice: Subject to any disclaimer, the term of this patent is extended or adjusted under 35 U.S.C. 154(b) by 0 days.

(21) Appl. No.: 14/380,916

(22) PCT Filed: Feb. 26, 2013

(86) PCT No.: PCT/JP2013/055020
§ 371 (c)(1),
(2) Date: Aug. 25, 2014

(87) PCT Pub. No.: WO2013/129429
PCT Pub. Date: Sep. 6, 2013

(65) Prior Publication Data
US 2015/0000080 A1 Jan. 1, 2015

(30) Foreign Application Priority Data
Feb. 28, 2012 (JP) .................. 2012-042170

(51) Int. Cl.
*B25G 1/10* (2006.01)
*B41J 29/00* (2006.01)
(Continued)

(52) U.S. Cl.
CPC . *B25G 1/10* (2013.01); *B41J 29/00* (2013.01); *B41J 29/13* (2013.01); *B65H 1/266* (2013.01); *G03G 15/6505* (2013.01); *G03G 21/16* (2013.01); *G03G 21/1647* (2013.01);
(Continued)

(58) Field of Classification Search
CPC ........ Y10T 16/44; Y10T 16/509; B25G 1/10; B65H 1/027; B65H 1/26; B65H 1/266; B65H 2402/10; B65H 2551/29; B65H 2601/326; B65H 2405/115; B65H 2405/312; B65H 2405/313; B65H 2405/332; G03G 15/6502; G03G 21/16; G03G 15/6505; G03G 21/1647; G03G 2221/1654; G03G 2221/1684; G03G 2221/1696; B41J 29/00; B41J 29/13; H04N 1/00533; H04N 1/00538; H04N 1/00543
USPC ............... 16/110.1, 443; 271/145, 9.01, 9.11; 399/110
See application file for complete search history.

(56) References Cited

U.S. PATENT DOCUMENTS 3,858,876 A * 1/1975 Williams ...................... 473/450
5,270,772 A * 12/1993 Akiyama ...................... 399/110
(Continued)

FOREIGN PATENT DOCUMENTS

JP H06-023946 U 3/1994
JP H11-127293 A 5/1999
(Continued)

*Primary Examiner* — William Miller
(74) *Attorney, Agent, or Firm* — Knobbe Martens Olson & Bear LLP

(57) ABSTRACT

The present invention relates to a multi-function peripheral 1 that can allow a paper feeding cassette deck 3 to connect to an apparatus main body 2. The paper feeding cassette deck 3 has an opening portion 17 and handles. The opening portion 17 is provided on a connecting face 3a with respect to the apparatus main body 2. The handle is configured with at least a part of a rear reinforcing frame 21 and a front reinforcing frame 22 composing an edge of the opening portion 17, the at least parts of the frames protruding inward.

10 Claims, 4 Drawing Sheets

(51) Int. Cl.
   *G03G 21/16* (2006.01)
   *G03G 15/00* (2006.01)
   *H04N 1/00* (2006.01)
   *B41J 29/13* (2006.01)
   *B65H 1/26* (2006.01)

(52) U.S. Cl.
   CPC ....... *H04N1/00533* (2013.01); *H04N 1/00538* (2013.01); *H04N 1/00543* (2013.01); *B65H 2402/10* (2013.01); *B65H 2405/115* (2013.01); *B65H 2405/312* (2013.01); *B65H 2405/313* (2013.01); *B65H 2405/332* (2013.01); *B65H 2551/29* (2013.01); *B65H 2601/326* (2013.01); *G03G 2221/1654* (2013.01); *G03G 2221/1684* (2013.01); *G03G 2221/1696* (2013.01); *Y10T 16/44* (2015.01)

(56) References Cited

U.S. PATENT DOCUMENTS

| | | | | |
|---|---|---|---|---|
| 5,666,595 | A * | 9/1997 | Sameshima et al. | 399/110 |
| 5,758,249 | A * | 5/1998 | Dutton et al. | 399/391 |
| 6,022,638 | A * | 2/2000 | Horton et al. | 429/187 |
| 7,431,287 | B2 * | 10/2008 | Hayashi et al. | 271/162 |
| 2008/0284086 | A1 * | 11/2008 | Kawasaki et al. | 271/145 |
| 2009/0074456 | A1 * | 3/2009 | Tada et al. | 399/124 |
| 2009/0116865 | A1 * | 5/2009 | Hanano | 399/92 |
| 2014/0001696 | A1 * | 1/2014 | Yoshida | 271/9.01 |

FOREIGN PATENT DOCUMENTS

| | | | |
|---|---|---|---|
| JP | 2002-332127 | A | 11/2002 |
| JP | 2004-048232 | A | 2/2004 |
| JP | 2005-026795 | A | 1/2005 |
| JP | 2005-024707 | A | 2/2005 |
| JP | 2006-251740 | A | 9/2006 |
| JP | 2007-006513 | A | 1/2007 |
| JP | 2007-223244 | A | 9/2007 |
| JP | 2009-214429 | A | 9/2009 |
| JP | 2009-294561 | A | 12/2009 |
| JP | 2010-000661 | A | 1/2010 |
| JP | 2011-075747 | A | 4/2011 |
| JP | 2012-006684 | A | 1/2012 |
| JP | 2012-073531 | A | 4/2012 |
| JP | 2012-076333 | A | 4/2012 |
| JP | 2011-215261 | A | 10/2012 |

* cited by examiner

SHEET FEEDING DEVICE AND IMAGE FORMING APPARATUS

CROSS-REFERENCE TO RELATED APPLICATIONS

This application is the U.S. National Phase under 35. U.S.C. §371 of International Application PCT/JP2013/055020, filed Feb. 26, 2013, which claims priority to Japanese Patent Application No. 2012-042170, filed Feb. 28, 2012. The disclosures of the above-described applications are hereby incorporated by reference in their entirety. The International Application was published under PCT Article 21(2) in a language other than English.

TECHNICAL FIELD

The present invention relates to a sheet feeding device that feeds a sheet in an image forming apparatus, for example a copy machine, a printer, a multi-function peripheral, and the like, and as well as an image forming apparatus.

BACKGROUND ART

Conventionally, a copy machine, a printer, a multi-function peripheral that are equipped with a paper feeding cassette for storing a large number of sheets of paper have been well known.

In the above described paper feeding cassette, a type and an amount of paper that can be stored are limited. For this reason, an apparatus has been well known that allows addition of the paper feeding cassette by means of a sheet feeding device, which is provided with paper feeding cassettes, connected to an apparatus main body.

Upon lifting up and removing the sheet feeding device from a package material for installation of the sheet feeding device, it has been necessary to support a bottom face or other parts that are easy to support, or to grip a handle. As a handle that a user grips during transportation and the like, a handle that is stored on a side face of an image forming apparatus and can be pulled out upon transportation has been known (refer for example to Patent Document 1).

Patent Document 1: Japanese Unexamined Patent Application Publication No. 2009-214429

DISCLOSURE OF THE INVENTION

Problems to be Solved by the Invention

However, in the above described conventional image forming apparatus, the handle that can be stored and pulled out is provided on the side face of the apparatus main body, presenting a problem of a structure becoming complex and of the apparatus main body becoming large in a direction of the side faces. In addition, this presented a problem in putting an operator's hand deep into a gap between a package and the apparatus main body for gripping the handle, upon taking out the apparatus main body from a box-shaped package. For this reason, an additional gripping part has been provided in an upper part of the apparatus main body, a larger package has been used, or the package has been cut out. However, this presented a problem of increased cost in packaging and transportation. Especially, during installation or unpacking of the sheet feeding device, an operator may contact an unsafe part such as a burr or grip a part of low strength.

Given this, the present invention has an objective of providing a sheet feeding device that has a simple structure, suppresses increase in size in a direction of the side faces, and allows safe and easy lifting, as well as an image forming apparatus that allows loading of the sheet feeding device.

Means for Solving the Problems

In order to solve the abovementioned problems, the present invention is a sheet feeding device that can be connected to an apparatus main body of an image forming apparatus, the device being characterized by providing an opening portion and a handle. The opening portion is provided on a connecting face with respect to the apparatus main body. The handle is configured with at least a part of a frame composing an edge of the opening portion, the at least a part of the frame protruding inwards.

In addition, the present invention is an image forming apparatus that can allow the sheet feeding device to connect to a bottom face of an apparatus main body, the sheet feeding device is characterized by providing an opening portion and a handle. The opening portion is provided to face a bottom face of the apparatus main body.

Effects of the Invention

According to the present invention described above, a simple structure, suppression of increase in size of the device in a direction of the side faces, and safe and easy lifting are realized.

PREFERRED MODE FOR CARRYING OUT THE INVENTION

The image forming apparatus according to the present invention is described hereinafter. In the following description, a vertical direction, a lateral direction, and a depth direction are based on a vertical direction, a lateral direction, and a depth direction seen from a user who is operating a multi-function peripheral 1.

Figure 1:
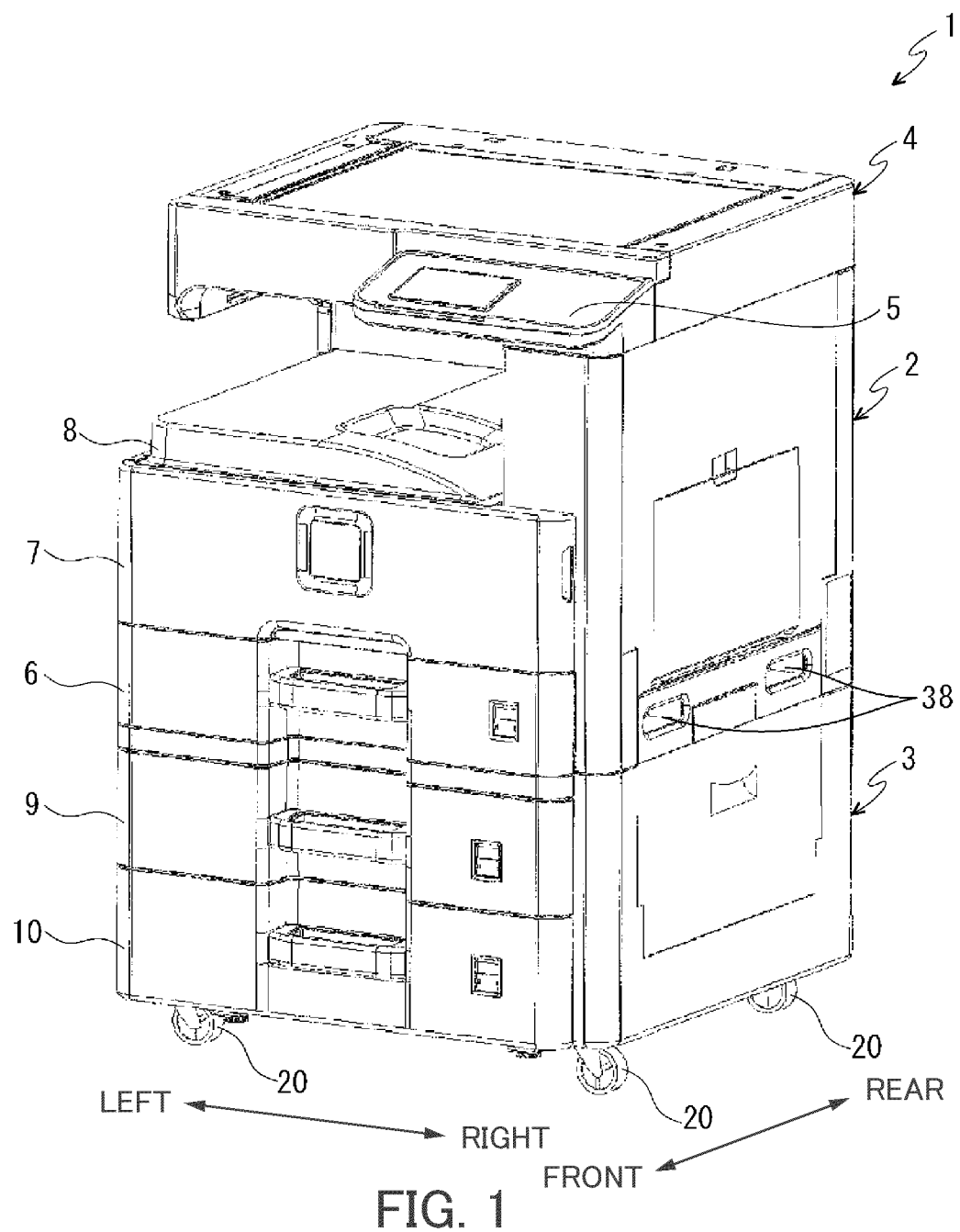
FIG. 1 is a perspective view of an image forming apparatus according to an embodiment of the present invention.

The multi-function peripheral 1 as the image forming apparatus according to an embodiment of the present invention is provided with an apparatus main body 2, a paper feeding cassette deck 3, and an image reading device 4 as shown in FIG. 1. The paper feeding cassette deck 3 as an optional sheet feeding device is attached to a lower part of the apparatus main body 2. The image reading device 4 is disposed in an upper part of the apparatus main body 2.

The apparatus main body 2 is provided with an operation panel unit 5, a paper feeding cassette 6, a processing unit 7, and an ejected paper tray unit 8. The operation panel unit 5 is operated upon use of various settings, a copy function, or a facsimile function. The paper feeding cassette 6 can store transfer paper. The processing unit 7 stores a well-known image forming processing unit (not illustrated). The ejected paper tray unit 8 stores the transfer paper after an image forming process.

The paper feeding cassette deck 3 can be optionally installed, separately from the paper feeding cassette 6 provided in the apparatus main body 2, on a lower side of the paper feeding cassette 6 in a detachable manner. In the present embodiment, the paper feeding cassette deck 3 is provided with two paper feeding cassettes 9, 10 one above the other. As a result, the image forming apparatus 1 can store transfer paper of three sizes (for example, A4, A3, and B5) by means of the three paper feeding cassettes 6, 9, and 10 arranged vertically.

Figure 2:
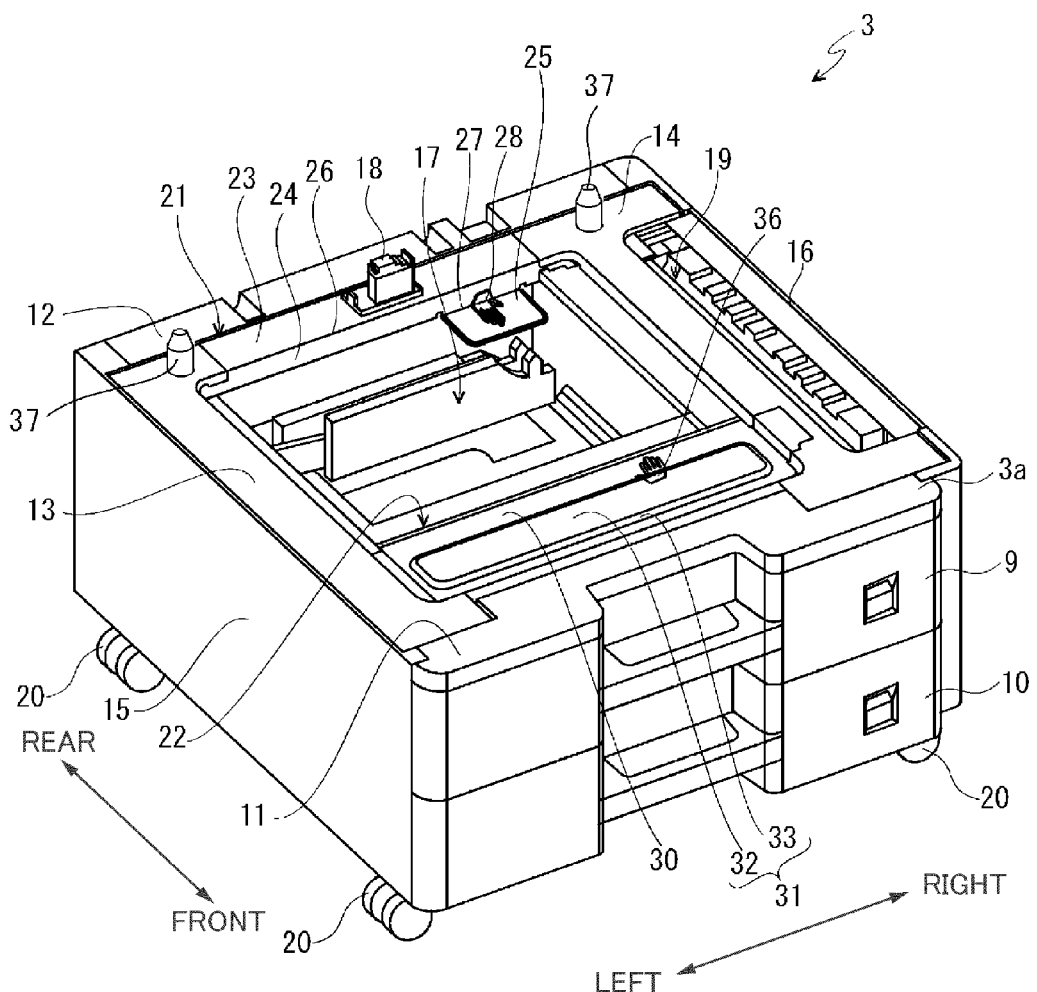
FIG. 2 is a perspective view of a sheet feeding device according to an embodiment of the present invention.

The paper feeding cassette deck 3 has a box-like shape as shown in FIG. 2. The paper feeding cassette deck 3 has support pillars on four corners thereof. Lower ends of the support pillars are connected with each other by a bottom plate (not illustrated). Upper ends of the support pillars are connected with each other by a front frame 11, a rear frame 12, a left frame 13, and an upper right frame 14. In addition, a left cover 15 is attached to a left side face of the paper feeding cassette deck 3. A right cover 16 is attached to a right side face of the paper feeding cassette deck 3.

An upper face of the paper feeding cassette deck functions as a connecting face 3*a* to which the apparatus main body 2 is connected. At a center of the connecting face 3*a*, an opening portion 17 is formed. The opening portion 17 has an upper part being open and has a substantially rectangular shape in a plan view. On a rear side of the opening portion 17 on the connecting face 3*a*, a lower connector 18 is provided. The lower connector 18 protrudes upward and is connected with an upper connector (not illustrated) of the apparatus main body 2. On a right side of the opening portion 17 on the connecting face 3*a*, a paper feeding unit 19 is provided. An upper end portion of the paper feeding unit 19 protrudes from the connecting face 3*a* and conveys the transfer paper stored in the paper feeding cassettes 9, 10 in a direction of the apparatus main body 2 (toward an upper side in the present embodiment).

In addition, on the paper feeding unit 19-side of the inside of the paper feeding cassette deck 3, a driving motor and the like are disposed. Therefore, the paper feeding unit 19-side of the paper feeding cassette deck 3 is greater in weight than an opposite side in the lateral direction, on which the paper feeding unit 19, the driving motor, and the like are not disposed. Wheels 20 are fixed to four corners of a bottom face of the paper feeding cassette deck 3.

In addition, a laterally elongated plate-like rear reinforcing frame 21, which constitutes a rear edge of an opening edge of the opening portion 17, and a laterally elongated plate-like front reinforcing frame 22, which constitutes a front edge, are fixed onto the connecting face 3*a* of the paper feeding cassette deck 3 by means of screws or the like.

The rear reinforcing frame 21 is provided with a placement plate 23, a vertical plate 24, and a protruding plate 25. The placement plate 23 is placed on the upper face of the rear frame 12. The vertical plate 24 bends toward a lower side substantially vertically from a front end of the placement plate 23. The protruding plate 25 bends toward a front side substantially vertically from a lower end of the vertical plate 24 from a position closer to the paper feeding unit 19 than to a center in the lateral direction, protruding to bulge to the inside of the opening portion 17. In other words, the protruding plate 25 is arranged at a position closer to the paper feeding unit 19 in the lateral direction of the paper feeding cassette deck 3, according to a center of gravity of the paper feeding cassette deck 3. In addition, a space is provided on a lower side of the protruding plate 25.

As a result, in the rear reinforcing frame 21, a lower bent portion 26 and a front bent portion 27 are formed. The lower bent portion 26 makes the vertical plate 24 bend toward a lower side, a boundary between the placement plate 23 and the vertical plate 24. The front bent portion 27 makes the protruding plate 25 bend toward a front side, a boundary between the vertical plate 24 and the protruding plate 25.

Figure 3A:
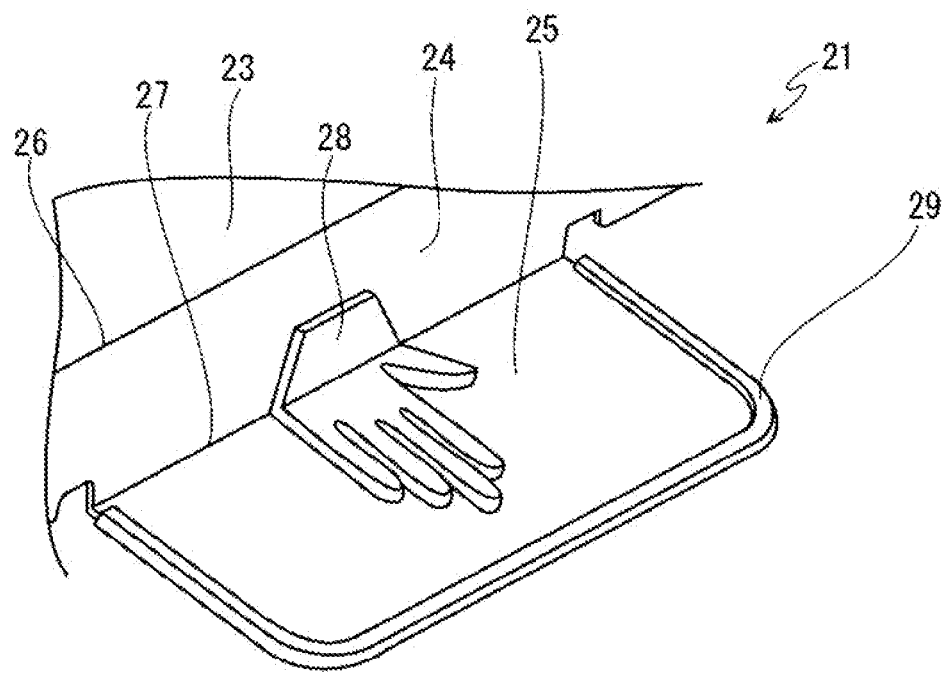
FIG. 3A is a perspective view of a mark formed on a rear reinforcing frame according to an embodiment of the present invention.

The vertical plate 24 and the protruding plate 25 are engraved with a mark 28, as shown in FIG. 3A. The mark 28 is in a shape representing a human hand with fingertips directing inward, across the front bent portion 27. The mark 28 is elevated toward a front side from the vertical plate 24 by a thickness of the plate, and elevated toward an upper side from the protruding plate 25 by a thickness of the plate. In addition, the protruding plate 25 is provided with a rib 29. The rib 29 has a shape formed by hemming an outer peripheral edge of the protruding plate 25 at 180 degrees in an upward direction, and follows the outer peripheral edge. The rib 29 suppresses a risk of an operator contacting a burr formed on the outer peripheral edge of a sheet metal before hemming.

The rear reinforcing frame 21 thus configured is processed as follows. First, the mark 28 is formed by raising a sheet metal, which is stamped out, by a drawing process, from a reverse face (a face not illustrated in FIG. 3A) side toward a front face side. Next, the rib 29 is formed in the outer periphery of the protruding plate 25 by a bending process, and bending the front bent portion 27 while directing a side on which the mark 28 is raised to the inside. The rear reinforcing frame 21 is formed by the above described processes.

On the other hand, a left end portion of the front reinforcing frame 22 is placed on a front upper face of the left frame 13. A front portion of the front reinforcing frame 22 is placed on an upper face of the front frame 11. A right end portion of the front reinforcing frame 22 is placed on a front upper face of the upper right frame 14. These portions that are placed are fixed by means of screws or the like. In addition, the rear end portion side of the front reinforcing frame 22 is provided with a bulging plate 30 that bulges to the inside of the opening portion 17 and a space is provided on a lower side of the bulging plate 30. In a central part of the bulging plate 30, a raised portion 31 which is raised toward an upper side from a slightly inner side of the outer peripheral edge of the front reinforcing frame 22 is provided. The raised portion 31 is provided with a flat ceiling plate 32 that has a substantially rectangular shape in a plan view, and a tilted plate 33 that gradually spreads from the outer periphery of the ceiling plate 32 to a lower side.

As a result, in the front reinforcing frame 22, a tilted bent portion 34 and an inner bent portion 35 are formed. The tilted bent portion 34 makes the tilted plate 33 bend obliquely upward toward a center of the raised portion 31, a boundary between the bulging plate 30 and the tilted plate 33. The inner bent portion 35 makes the ceiling plate 32 bend inward toward the center of the raised portion 31, a boundary between the tilted plate 33 and the ceiling plate 32.

Figure 3B:
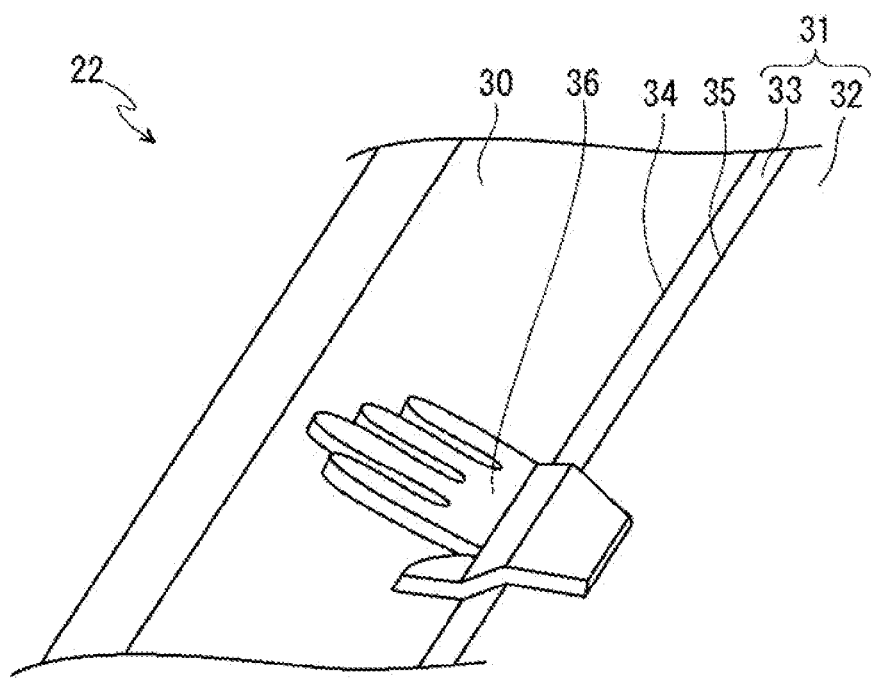
FIG. 3B is a perspective view of a mark formed on a front reinforcing frame.

In addition, as shown in FIG. 3B, a mark 36 is engraved at a position closer to the paper feeding unit 19 than to a center in the lateral direction of the bulging plate 30, the tilted plate 33, and the ceiling plate 32. The mark 36 is in a shape representing a human hand with fingertips directing inward, across the tilted bent portion 34 and the inner bent portion 35. In other words, the mark 36 is arranged at a position closer to the paper feeding unit 19 in the lateral direction of the paper feeding cassette deck 3, according to a center of gravity of the paper feeding cassette deck 3. The mark 36 is elevated toward an upper side from the bulging plate 30 and the ceiling plate 32 by a thickness of the plate, and elevated toward an obliquely upper side from the tilted plate 33 by a thickness of the plate.

The front reinforcing frame 22 thus configured is processed as follows. First, the mark 36 is formed by drawing a sheet metal, which is stamped out, by a drawing process, from a reverse face (a face not illustrated in FIG. 3B) side toward a front face side. Next, the tilted bent portion 34 is bent while directing a side on which the mark 36 protrudes to the inside, and the inner bent portion 35 is bent while directing a side on which the mark 36 protrudes to the outside. The front reinforcing frame 22 is formed by the above described processes.

In a matter configured as described above, upon lifting up the paper feeding cassette deck 3, an operator visually observes the connecting face 3a, which is an upper face of the paper feeding cassette deck 3, to thereby visually recognize the mark 28 engraved on the rear reinforcing frame 21 and the mark 36 engraved on the front reinforcing frame 22. One thus recognizes that a portion in the rear reinforcing frame 21 with the mark 28 being formed and a portion in the front reinforcing frame 22 with the mark being formed are positions to grip. Thereafter, the operator can lift up the paper feeding cassette deck 3 by inserting a hand into the opening portion 17 from the connecting face 3a side and gripping a bottom part of the protruding plate 25 on which the mark 28 is formed and a bottom part of the bulging plate 30, the tilted plate 33, and the ceiling plate 32 on which the mark 36 is formed.

The rear reinforcing frame 21 and the front reinforcing frame 22 which function as handles to grip upon lifting up the paper feeding cassette deck 3 can thus be provided in simple structures. In addition, since the rear reinforcing frame 21 and the front reinforcing frame 22 bulge toward the inside of the opening portion 17, the increase in size of the paper feeding cassette deck 3 as the sheet feeding device in a direction of the side faces can be suppressed, and, in a case in which the paper feeding cassette deck 3 is stored in a box-shaped package, the rear reinforcing frame 21 and the front reinforcing frame 22 can be easily gripped upon taking out the paper feeding cassette deck 3 from the package. The paper feeding cassette deck 3 can thus be lifted up safely and easily.

In addition, since the rear reinforcing frame 21 is engraved with the mark 28 and the front reinforcing frame 22 is engraved with the mark 36, the handles and positions to grip can be easily recognized when the operator is lifting the paper feeding cassette deck 3. This can prevent the operator from holding parts other than the handles, contacting an unsafe part such as a burr, and gripping a fragile part of the paper feeding cassette deck 3.

Furthermore, since the lower bent portion 26 and the front bent portion 27 are formed on the rear reinforcing frame 21, these bent portions 26 and 27 can distribute stress upon grip of the rear reinforcing frame 21. Similarly, since the tilted bent portion 34 and the inner bent portion 35 are formed on the front reinforcing frame 22, these bent portions 34 and 35 can distribute stress upon grip of the front reinforcing frame 22. This can improve strength of the rear reinforcing frame 21 and the front reinforcing frame 22 and suppress deformation of the rear reinforcing frame 21 and the front reinforcing frame 22 upon lifting up the paper feeding cassette deck 3.

Moreover, since the marks 28, 36 are formed by a drawing process, the mark 28 can distribute the stress upon grip of the rear reinforcing frame 21 and the mark 36 can distribute the stress upon grip of the front reinforcing frame 22. This can improve strength of the rear reinforcing frame 21 and the front reinforcing frame 22 and suppress deformation of the rear reinforcing frame 21 and the front reinforcing frame 22 upon lifting up the paper feeding cassette deck 3.

In addition, since the mark 28 is formed across the lower bent portion 26 and the front bent portion 27, strength of the lower bent portion 26 can be improved. Since the mark 36 is formed across the tilted bent portion 34 and the inner bent portion 35, strength of the tilted bent portion 34 and the inner bent portion 35 can be improved.

In addition, the rear reinforcing frame 21 and the front reinforcing frame 22 are provided on both sides of the opening portion 17. As a result, by gripping both the rear reinforcing frame 21 and the front reinforcing frame 22, a load upon lifting up the paper feeding cassette deck 3 can be distributed, and the paper feeding cassette deck 3 can be made easier to lift up.

In addition, since the marks 28 and 36 are formed at positions closer to the paper feeding unit 19 than a center in the lateral direction of the paper feeding cassette deck 3, according to a center of gravity of the paper feeding cassette deck 3, tilt of the paper feeding cassette deck 3 can be suppressed when the paper feeding cassette deck 3 is lifted up. As a result, in a case in which the paper feeding cassette deck 3 is stored in a box-shaped package, the paper feeding cassette deck 3 is easy to lift up when the paper feeding cassette deck 3 is taken out from the package, and is easy to take out from the box-shaped package.

Figure 4A:
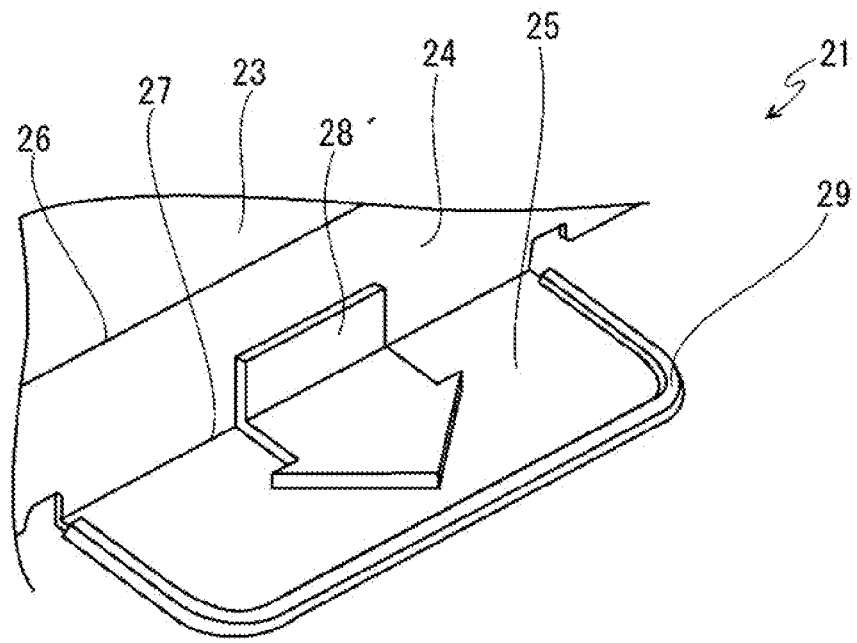
FIG. 4A is a perspective view of a mark formed on a rear reinforcing frame according to a modification of the embodiment of the present invention.
Figure 4B:
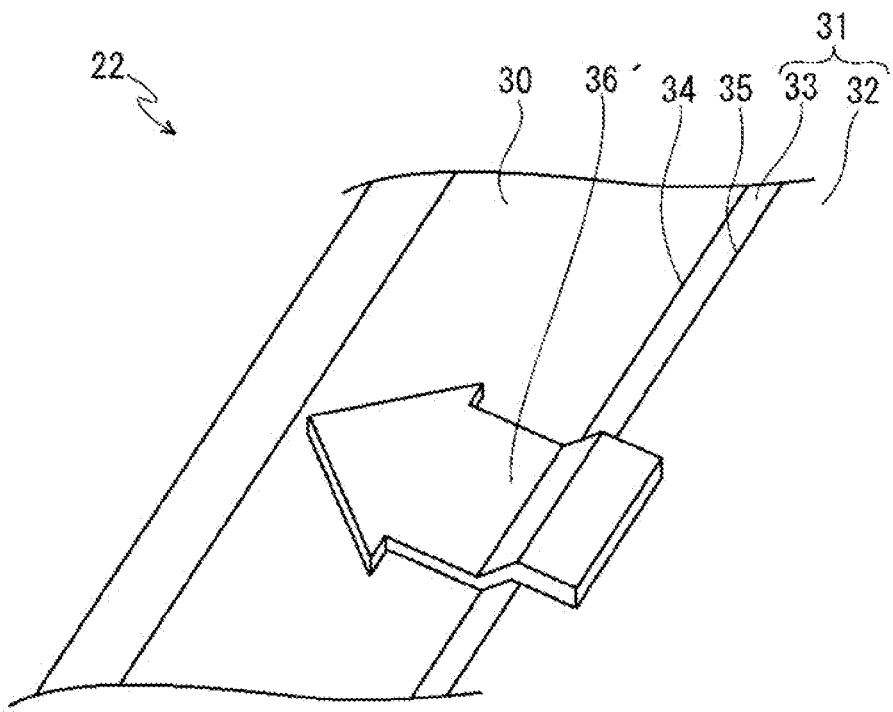
FIG. 4B is a perspective view of a mark formed on a front reinforcing frame.

It should be noted that, in the above described embodiment, the marks 28 and 36 in shapes representing human hands are engraved; however, in other embodiments, as shown in FIG. 4, the marks 28' and 36' can be engraved in shapes representing arrows with points being directed to the inside. In other words, the shapes of the marks 28' and 36' can be changed in such a degree that the operator can visually recognize positions to grip compared to the shape representing a human hand, thereby increasing a degree of freedom of changing the shapes of the marks 28' and 40'. In this case, lengths of the mark 28' and the protruding plate 25 in a depth direction are configured to be short. As a result, an area of the opening portion 17 is increased, and it is easier to insert a hand into the opening portion 17 when the operator lifts the paper feeding cassette deck 3.

Here, a connection between the apparatus main body 2 and the paper feeding cassette deck 3 is described. The paper feeding cassette deck 3 is provided with a positioning member 37 for positioning in a horizontal direction upon connection to a lower part of the apparatus main body 2. The positioning member 37 is a pin-shaped member with a tapered shape in a tip end part thereof, and is provided so as to protrude to an upper face of a rear part of the left frame 13 and the upper right frame 14. In addition, a positioning hole as a positioning target portion which is not illustrated is provided on a bottom face of the apparatus main body 2 so as to correspond to the positioning member 37. On left and right side faces of the apparatus main body 2, a main body handle 38 is formed in a concave shape. The apparatus main body 2 is placed onto the paper feeding cassette deck 3 by holding the main body handles 38. Here, by engaging the positioning hole on the bottom face of the apparatus main body 2 with the positioning member 37, the apparatus main body 2 is positioned with respect to the paper feeding cassette deck 3 in the horizontal direction. In addition, a part of the bottom face of the apparatus main body 2 is supported by the left frame 13 and the upper right frame 14, and positioned in the vertical direction. And then, the apparatus main body 2 is connected with the paper feeding cassette deck 3 by means of a fixing means which is not illustrated. In a state in which the apparatus main body 2 is connected with the paper feeding cassette deck 3, the opening portion 17 of the paper feeding cassette deck 3 is covered by the bottom face of the apparatus main body 2. When the copy machine 1 is to be moved, the main body handle 38 and the like can be held and operated.

As described above, in the image forming apparatus of the present invention, the paper feeding cassette deck 3 can be connected to the apparatus main body 2 as necessary. A user can select a configuration of the copy machine 1 according to the need, and is not forced to bear an unnecessary installation space and cost. In addition, when the paper feeding cassette deck 3 is connected to the apparatus main body 2, the paper feeding cassette deck 3 can be safely and easily taken out from a package box and handled.

What is claimed is:

1. A sheet feeding device connectable to an apparatus main body of an image forming apparatus, comprising:
    a paper feeding cassette configured to be attachable to and detachable from the sheet feeding device in a front-rear direction thereof;
    a connecting face, which is disposed at an upper side of the sheet feeding device, configured to be attachable to the apparatus main body;
    an opening portion shaped substantially rectangular in a planar view that is provided in a central region of the connecting face with respect to the front-rear direction and a left-right direction of the sheet feeding device, a periphery of the opening portion being surrounded by a frame; and
    a paper feeding unit configured to feed a sheet accommodated in the paper feeding cassette to the apparatus main body, the paper feeding unit being disposed outside the opening portion and on a left or right side of the opening portion,
    wherein a first handle of a single piece of sheet metal is provided at a first part of the frame which constitutes a rear edge of the opening portion, elements of the first handle including a placement plate configured to provide a part of the connecting face, a vertical plate configured to bend downward from a front end of the placement plate, and a protruding plate, which is at least a part of a downward portion of the vertical plate, configured to bend and protrude inward with respect to the opening portion.

2. The sheet feeding device according to claim 1, wherein the first handle is engraved with a mark.

3. The sheet feeding device according to claim 2, wherein the mark is formed across a bent portion between the vertical plate and the protruding plate.

4. The sheet feeding device according to claim 3, wherein the mark is formed by drawing.

5. The sheet feeding device according to claim 4, wherein the mark is in a shape representing a human hand.

6. The sheet feeding device according to claim 5, wherein the mark is formed at a position which is off to a side to be closer to the paper feeding unit in the left-right direction.

7. The sheet feeding device according to claim 6, wherein a second handle of a single piece of sheet metal is provided at a second part of the frame which constitutes a front edge of the opening portion.

8. The sheet feeding device according to claim 1, wherein the protruding plate comprises a rib which is provided by an upwardly folded external peripheral edge of the protruding plate.

9. An image forming apparatus comprising an apparatus main body to a bottom face of which a sheet feeding device is configured to be connectable,
    wherein the sheet feeding device includes:
    a paper feeding cassette configured to be attachable to and detachable from the sheet feeding device in a front-rear direction thereof;
    a connecting face, which is disposed at an upper side of the sheet feeding device, configured to be attachable to the apparatus main body;
    an opening portion, which faces the bottom face of the apparatus main body and which is shaped substantially rectangular in a planar view, provided in a central region of the connecting face with respect to the front-rear direction and a left-right direction of the sheet feeding device, a periphery of the opening portion being surrounded by a frame; and
    a paper feeding unit configured to feed a sheet accommodated in the paper feeding cassette to the apparatus main body, the paper feeding unit being disposed outside the opening portion and on a left or right side of the opening portion,
    wherein a handle of a single piece of sheet metal is provided at a part of the frame which constitutes a rear edge of the opening portion, elements of the handle including a placement plate configured to provide a part of the connecting face, a vertical plate configured to bend downward from a front end of the placement plate, and a protruding plate, which is at least a part of a downward portion of the vertical plate, configured to bend and protrude inward with respect to the opening portion.

10. The image forming apparatus according to claim 9, wherein the frame is configured to support a part of the apparatus main body and is provided with a positioning member for positioning in a horizontal direction with respect to the apparatus main body.

* * * * *